(12) United States Patent
Bohn et al.

(10) Patent No.: US 10,339,699 B2
(45) Date of Patent: Jul. 2, 2019

(54) ADAPTIVE USAGE OF AVAILABLE STORAGE FOR ACCELERATED VOLUME RENDERING

(71) Applicants: Lars Bohn, Neunkirchen am Brand (DE); Felix Dingeldey, Erlangen (DE)

(72) Inventors: Lars Bohn, Neunkirchen am Brand (DE); Felix Dingeldey, Erlangen (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 15/616,896

(22) Filed: Jun. 7, 2017

(65) Prior Publication Data

US 2018/0357814 A1 Dec. 13, 2018

(51) Int. Cl.
*G06T 15/08* (2011.01)
*G06T 9/00* (2006.01)
*G06T 15/00* (2011.01)

(52) U.S. Cl.
CPC ............... *G06T 15/08* (2013.01); *G06T 9/00* (2013.01); *G06T 15/005* (2013.01); *G06T 2210/41* (2013.01)

(58) Field of Classification Search
None
See application file for complete search history.

(56) References Cited

U.S. PATENT DOCUMENTS

2008/0137970 A1* 6/2008 Kubota ............... G06K 9/342
382/224

OTHER PUBLICATIONS

Jones et al. (3D distance fields: A survey of techniques and applications, IEEE, vol. 12, No. 4) (Year: 2006).*
Cohen, D., & Sheffer, Z., "Proximity clouds—an acceleration technique for 3D grid traversal," The Visual Computer 11.1, pp. 27-38 (1994).
Freund, J., & Sloan, K., "Accelerated volume rendering using homogeneous region encoding," Proceedings of the 8th conference on Visualization '97, IEEE Computer Society, 7 pages (1997).
Hadwiger, M. et al., "Real-Time Ray-Casting and Advanced Shading of Discrete Isosurfaces," Computer Graphics Forum, vol. 24, No. 3, pp. 303-312 (2005).
Li, W., Mueller, K., & Kaufman, A., "Empty space skipping and occlusion clipping for texture-based volume rendering,"Proceedings of the 14th IEEE Visualization 2003, 8 pages (2003).
P. Ferschin et al., "A Comparison of techniques for the Transformation of Radiosity Values to Monitor Colors," Proceedings of 1st IEEE International Conference on Image Processing, Austin, Texas. vol. 3, pp. 992-996 (1994).
Vidal, V., Mei, X., & Decaudin, P., "Simple empty-space removal for interactive volume rendering," Journal of Graphics GPU, and Game Tools, 13(2), pp. 21-37 (2008).

(Continued)

*Primary Examiner* — Kyle Zhai
(74) *Attorney, Agent, or Firm* — Lempia Summerfield Katz LLC

(57) ABSTRACT

In order to decrease a memory footprint for volume rendering, distance field information is adaptively compressed and merged with an existing data structure having unused memory to form a merged dataset. During rendering, the merged dataset is sampled, and a sampled value is used to identify a look-up table for a corresponding voxel or is decompressed and used to skip empty space.

9 Claims, 6 Drawing Sheets

(56) References Cited

OTHER PUBLICATIONS

Bullitt, Elizabeth, and Stephen R. Aylward, "Volume rendering of segmented image objects," IEEE Transactions on Medical Imaging, vol. 21, No. 8, pp. 998-1002, 2002.
European Search Report for corresponding Application No. 18171159.9 filed Nov. 6, 2018.
Jones, Mark W., "Distance field compression," Journal of WSCG, vol. 12, pp. 199-204, 2004.
Jones, Mark W., J. Andreas Baerentzen, and Milos Sramek, "3D distance fields: A survey of techniques and applications," IEEE Transactions on visualization and Computer Graphics, vol. 12, No. 4, pp. 581-599, 2006.

* cited by examiner

ADAPTIVE USAGE OF AVAILABLE STORAGE FOR ACCELERATED VOLUME RENDERING

FIELD

The present embodiments relate to adaptive usage of available storage for accelerated volume rendering.

BACKGROUND

Volumetric data and three-dimensional visualization of the volumetric data play an increasingly important role in a number of fields such as, for example, medicine, industrial quality assurance, engineering, and geology. In a scalar volumetric dataset, different grayscale values correspond to different structures of a represented object (e.g., different types of tissue within the body of a human). Discrete elements of the scalar volumetric dataset are voxels.

Direct volume rendering (DVR) displays a colored image of the different structures of the represented object by integrating interactions of light with imaginary gaseous materials represented within the scalar volumetric dataset along viewing rays. The light-material interactions are modeled by mapping different data values (e.g., grayscale values) to different opacities and colors. This mapping classifies the different objects represented within the scalar volumetric dataset.

DVR allows for a fast and efficient exploration of the different classified objects. During rendering, a transfer function or look-up table (LUT) defines a color and an opacity pair for each value in a data range. By setting an interval of data values to completely transparent, irrelevant structures (e.g., surrounding air) may be made invisible.

More advanced DVR techniques allow individual LUTs to be defined for different structures represented within the scalar volumetric dataset. A label volume may be used during rendering to provide an integer valued index for selecting the correct LUT.

DVR is a very expensive technique computationally. In order to provide interactive rendering speeds, efficient acceleration techniques may be used. Due to the high memory consumption for DVR, there is a tradeoff between acceleration and memory cost.

One acceleration technique is to skip empty (e.g., invisible) space of the scalar volumetric dataset. The scalar volumetric dataset is preprocessed to find empty regions, and this information is stored in dedicated data structures provided for fast lookup during rendering. Data structures and algorithms based on, for example, distance fields may be used. The distance to the nearest non-empty space is encoded for each voxel. Needed empty space information is calculated and stored in static data structures that are optimized for fast lookup. The static data structures may consume a large amount of memory, which may be scarce for volume rendering applications (e.g., due to graphics processing units (GPUs) being used).

SUMMARY

In order to decrease a memory footprint for volume rendering, distance field information is adaptively compressed and merged with an existing data structure having unused memory to form a merged dataset. During rendering, the merged dataset is sampled, and a sampled value is used to identify a look-up table for a corresponding voxel or is decompressed and used to skip empty space.

In a first aspect, a method for adaptively storing distance information for volume rendering a first volumetric dataset is provided. The first volumetric dataset includes voxels having respective values. The method includes generating, by a processor, a second volumetric dataset. The second volumetric dataset identifies a first subset of the voxels of the first volumetric dataset representing empty space and a second subset of the voxels of the first volumetric dataset representing non-empty space. The processor generates a distance field based on the second volumetric dataset. The distance field identifies, for each voxel of the first subset of voxels, a distance to a closest voxel of the second subset of voxels. The processor identifies a third volumetric dataset. The third volumetric dataset identifies, for each of the voxels, to which portion or portions of the first volumetric dataset the respective voxel belongs. The processor selects at least one compression method. The processor compresses the distance field based on the at least one compression method, and merges the compressed distance field with the third volumetric dataset.

In a second aspect, a method for generating a two-dimensional (2D) image from a first volumetric dataset is provided. The first volumetric dataset includes voxels representing respective first values. The method includes identifying, by a processor, a second volumetric dataset. The second volumetric dataset includes second values corresponding to the voxels of the first volumetric dataset, respectively. Each second value of a first subset of the second values represents a respective distance to a closest voxel. Each second value of a second subset of the second values identifies a transfer function to be used for the respective voxel. For each of at least a portion of the second values of the second volumetric dataset, the processor compares the respective second value to a predetermined value, and determines the distance to the closest voxel for the respective voxel or identifies the transfer function to be used for the respective voxel based on a result of the comparing of the respective second value to the predetermined value. The processor generates the 2D image based on the first volumetric dataset, and one or more determined distances, one or more identified transfer functions, or the one or more determined distances and the one or more identified transfer functions.

In a third aspect, a non-transitory computer-readable storage medium storing instructions executable by one or more processors to adaptively store distance information for volume rendering a first volumetric dataset is provided. The first volumetric dataset includes voxels having respective values. The instructions include generating a second volumetric dataset. The second volumetric dataset identifies a first subset of the voxels of the first volumetric dataset representing empty space and a second subset of the voxels of the first volumetric dataset representing non-empty space. The instructions also include generating a distance field based on the second volumetric dataset. The distance field identifies, for each voxel of the first subset of voxels, a distance to a closest voxel of the second subset of voxels. The instructions include identifying a third volumetric dataset. The third volumetric dataset identifies, for each of the voxels, to which portion or portions of the first volumetric dataset the respective voxel belongs. The instructions also include selecting at least one compression method, compressing the distance field based on the at least one compression method, and merging the compressed distance field with the third volumetric dataset.

In a fourth aspect, a non-transitory computer-readable storage medium storing instructions executable by one or more processors to generate a 2D image from a first volumetric dataset is provided. The first volumetric dataset includes voxels representing respective first values. The instructions include identifying a second volumetric dataset. The second volumetric dataset includes second values corresponding to the voxels of the first volumetric dataset, respectively. Each second value of a first subset of the second values represents a respective distance to a closest voxel. Each second value of a second subset of the second values identifies a transfer function to be used for the respective voxel. The instructions also include, for each of at least a portion of the second values of the second volumetric dataset, comparing the respective second value to a predetermined value, and determining the distance to the closest voxel for the respective voxel or identifying the transfer function to be used for the respective voxel based on a result of the comparing of the respective second value to the predetermined value. The instructions include generating the 2D image based on the first volumetric dataset, and one or more determined distances, one or more identified transfer functions, or the one or more determined distances and the one or more identified transfer functions.

DETAILED DESCRIPTION OF THE DRAWINGS

The systems and methods of the present embodiments build upon distance field information used for empty space skipping algorithms in volume rendering. The distance field information is adaptively compressed to an existing data structure to be used for the volume rendering depending on an available, unused space within the existing data structure.

Prior art volume rendering methods create distance fields statically, allocating as much additional space as is needed. Such prior art methods rely on the precision of generated distance fields during rendering.

By adaptively compressing the distance field information, as much space as is available within the existing data structure may be dynamically used. Rendering times may be decreased by a dynamic factor without consuming additional memory (e.g., within environments where rendering speed may be sacrificed to keep memory requirements at a constant rate). Unlike in the prior art, the volume rendering does not rely on precision of the calculated distance information; instead, as much distance field information as is available is used, and the rendering speed is reduced accordingly.

Further, different compression methods may be used in conjunction with each other. The best compression method may be selected adaptively at run-time depending on actual data being used or performance analyses of previous renderings.

Figure 1:
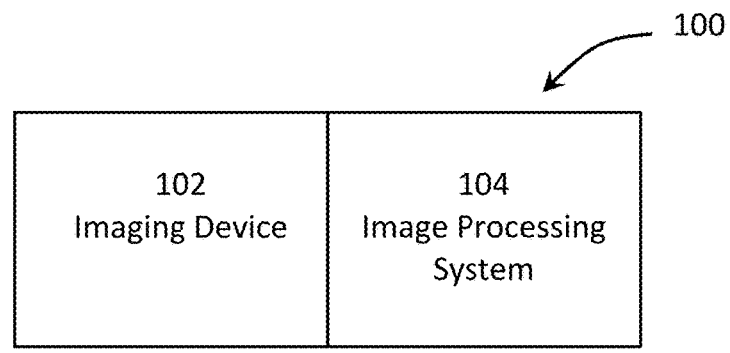
FIG. 1 shows one embodiment of an imaging system.

FIG. 1 shows one embodiment of an imaging system 100. The imaging system 100 may be used in the system and method described below. The imaging system 100 may include one or more imaging devices 102 (e.g., an imaging device) and one or more image processing systems 104 (e.g., an image processing system). A dataset representing a two-dimensional (2D) or a three-dimensional (3D) (e.g., volumetric) region may be acquired using the imaging device 102 and the image processing system 104. The 2D dataset or the 3D dataset may be obtained contemporaneously with the planning and/or execution of a medical treatment procedure or at an earlier time. Additional, different, or fewer components may be provided.

In one embodiment, the imaging system 100 is, for example, an MRI system. The imaging system 100 may be used to create a patient model that may be used in the planning of a medical treatment procedure. For example, the image processing system 104 is a workstation for treatment planning. In other embodiments, the imaging system 100 may include, for example, a medical workstation, a computed tomography (CT) system, an ultrasound system, a positron emission tomography (PET) system, an angiography system, a fluoroscopy, an x-ray system, any other now known or later developed imaging system, or any combination thereof. The workstation 104 receives data representing or images of the patient generated by the imaging device 102. The imaging system 100 may include more or fewer components.

Figure 2:
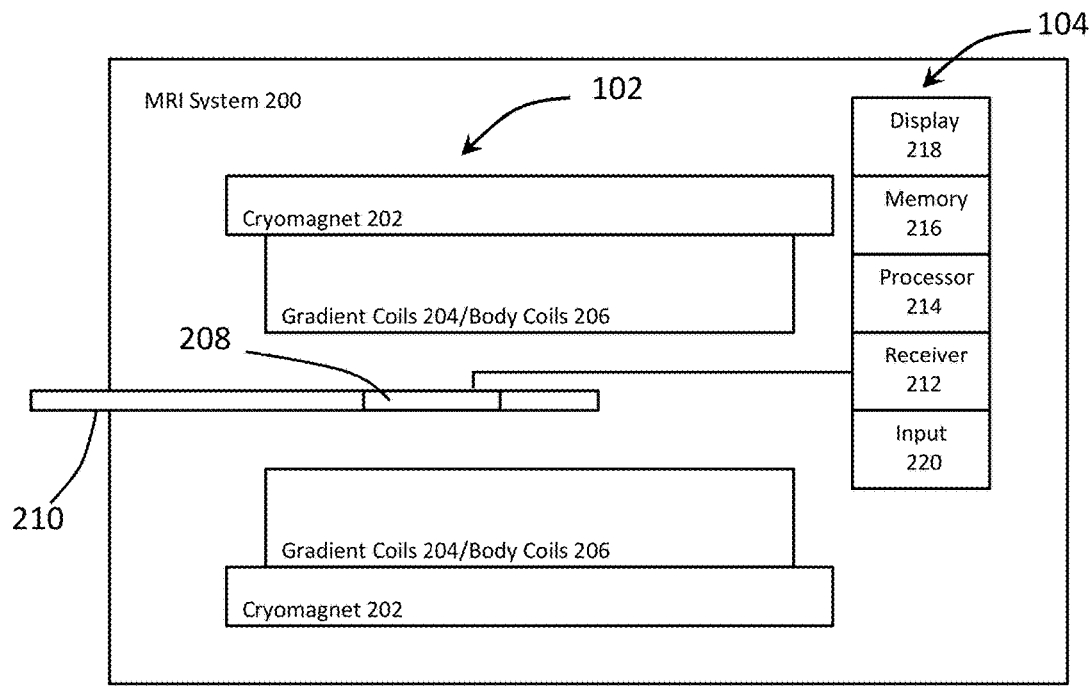
FIG. 2 shows one embodiment of a magnetic resonance imaging system.

FIG. 2 shows one embodiment of an MRI system 200. The MRI system 200 includes an MRI device 102 and the image processing system 104. The MRI device 102 includes a cryomagnet 202, gradient coils 204, a whole body coil 206 (e.g., body coils), a local coil 208, and a patient bed 210. The image processing system 104 may include an MR receiver 212, a processor 214, a memory 216, and a display 218. Additional, different, or fewer components may be provided. For example, an additional local coil or an additional surface coil may be provided for MR imaging. Additionally, a user input device (e.g., a keyboard and/or a mouse) may be provided for user control. As another example, the local coil 208 or the whole body coil 206 is not provided.

Other parts of the MRI system 200 are provided within a same housing, within a same room (e.g., within a radio frequency cabin), within a same facility, or connected remotely. The other parts of the MRI system 200 may include cooling systems, pulse generation systems, additional image processing systems, and user interface systems. Any now known or later developed MR imaging system may be used. The location of the different components of the MRI system 200 is within and/or outside the RF cabin, such as the imaging processing, tomography, power generation, and user interface components being outside the RF cabin. Power cables, cooling lines, and communication cables connect the pulse generation, magnet control, and detection systems within the RF cabin with the components outside the RF cabin through a filter plate.

In one embodiment, the processor 214 and the memory 216 are part of the MR receiver 212. Alternatively, the processor 214 and the memory 216 are part of an archival and/or image processing system, such as associated with a medical records database workstation or server. In yet other embodiments, the processor 214 and the memory 216 are a personal computer such as a desktop or a laptop, a workstation, a server, a network, or combinations thereof. The processor 214 and the memory 216 may be provided without other components for implementing the method.

The cryomagnet 202, the gradient coils 204, and the body coils 206 are in the RF cabin, such as a room isolated by a Faraday cage. A tubular or laterally open examination subject bore encloses a field of view. A more open arrangement may be provided. The patient bed 210 (e.g., a patient gurney or table) supports an examination subject such as, for example, a patient with a local coil arrangement, including the local coil 208 (e.g., a local coil). The patient bed 210 may be moved into the examination subject bore in order to generate images of the patient. In the embodiment shown in FIG. 2, the local coil 208 is located in the patient bed 210 (e.g., below a patient). In other embodiments, the local coil 208 may be located between the patient bed 210 and the patient, on a side of the patient, and/or above the patient, for example. Received signals may be transmitted by the local coil 208 to the MR receiver 212 via, for example, coaxial cable or radio link (e.g., via antennas) for imaging.

In order to examine the patient, different magnetic fields are temporally and spatially coordinated with one another for application to the patient. The cryomagnet 202 generates a strong static main magnetic field $B_0$ in the range of, for example, 0.2 Tesla to 3 Tesla or more. The main magnetic field $B_0$ is approximately homogenous in the field of view.

The nuclear spins of atomic nuclei of the patient are excited via magnetic radio-frequency excitation pulses that are transmitted via a radio-frequency antenna, shown in FIG. 2 in simplified form as a whole body coil 206 and/or possibly a local coil arrangement (e.g., the local coil 208 or local coils). Radio-frequency excitation pulses are generated, for example, by a pulse generation unit controlled by a pulse sequence control unit. After being amplified using a radio-frequency amplifier, the radio-frequency excitation pulses are routed to the body coils 206 and/or the local coils 208. Each of the body coils 206 is a single-part or includes multiple coils. The signals are at a given frequency band. For example, the MR frequency for a 3 Tesla system is about 123 MHz+/−500 kHz. Different center frequencies and/or bandwidths may be used.

The gradient coils 204 radiate magnetic gradient fields in the course of a measurement in order to produce selective layer excitation and for spatial encoding of the measurement signal. The gradient coils 204 are controlled by a gradient control unit that, like the pulse generation unit, is connected to the pulse sequence control unit. The gradient control unit, the pulse generation unit, and/or the pulse sequence control unit are represented, at least in part, by the processor 214 or another controller.

Signals emitted as a result of the excited nuclear spins are received by the local coil 208. In some MR tomography procedures, images having a high signal-to-noise ratio (SNR) may be formed using the local coil arrangement (e.g., loops, local coils). The local coil arrangement (e.g., antenna systems) is disposed in the immediate vicinity of the examination subject on (anterior) or under (posterior) or in the patient. The received signals are amplified by associated radio-frequency preamplifiers, transmitted in analog or digitized form, and processed further and digitized by the MR receiver 212. The digitized data is stored in the memory 216 as complex numeric values in a k-space matrix. An associated MR image of the examination subject may be reconstructed using a one-dimensional or a multidimensional Fourier transform (FT) from the k-space matrix populated with values. Reconstructed MR images of the examination subject may be stored in the memory 216 and/or displayed on the display 218.

The local coil 208 is conductive. For example, the local coil 208 is made of copper. The local coil 208 is used as a receive antenna. Any size coil may be used. Non-symmetric size may be provided. The local coil 208 may be a surface coil or a solenoid coil. Other local coil geometries may be provided.

The local coil 208 connects with the MR receiver 212. The connection is wired (e.g., using a coaxial cable) or wireless. The connection is for data from the local coil 208 to be transmitted to and received by the MR receiver 212. The data is K-space data. In response to an MR pulse, the local coil 208 receives signals and transmits the K-space data to the MR receiver 212. Any pulse sequence such as, for example, a simple pulse sequence acquiring projections along three spatial axes may be used. Any spatial resolution may be provided (e.g., a spatial resolution of 3 mm).

The MR receiver 212 includes the processor 214 or another processor (e.g., a digital signal processor, a field programmable gate array, or an application specific circuit for applying an inverse Fourier transform) for reconstructing the K-space data. The MR receiver 212 is configured by hardware or software to calculate X, Y, and Z projection data from the K-space data.

In the course of an MR measurement, the excited nuclei induce a voltage in the local coil 208. The induced voltage is amplified by a low-noise preamplifier (e.g., LNA, preamp) and forwarded to the MR receiver 212. Other transforms for reconstructing spatial data from the K-space data may be used.

The processor 214 is a general processor, a central processing unit, a control processor, a graphics processor, a digital signal processor, a three-dimensional rendering processor, an image processor, an application-specific integrated circuit, a field-programmable gate array, a digital circuit, an analog circuit, combinations thereof, or other now known or later developed device for image processing. The processor is a single device or multiple devices operating in serial, parallel, or separately. The processor 214 may be a main processor of a computer, such as a laptop or desktop computer, or may be a processor for handling some tasks in a larger system, such as being part of the MR receiver 212 or the imaging system 104. The processor 214 is configured by instructions, design, hardware, and/or software to perform the acts discussed herein.

The memory 216 is a computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 216 may be a single device or a combination of devices. The memory 216 may be adjacent to, part of, networked with and/or remote from the processor 214.

The display 218 is a monitor, a CRT, an LCD, a plasma screen, a flat panel, a projector or other now known or later developed display device. The display 208 is operable to generate images for a 2D view or a rendered three-dimensional representation. For example, a 2D image representing a three-dimensional volume through rendering is displayed.

Figure 3:
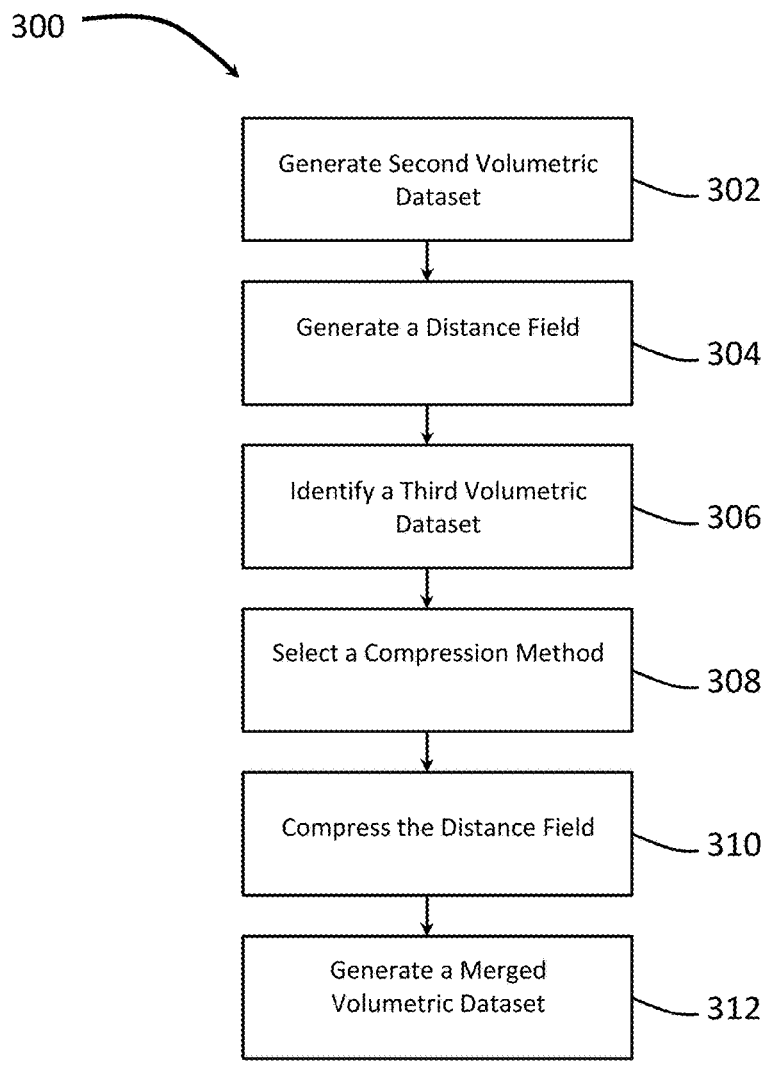
FIG. 3 shows a flowchart of one embodiment of a method for adaptively storing distance information for volume rendering a volumetric dataset.
Figure 4:
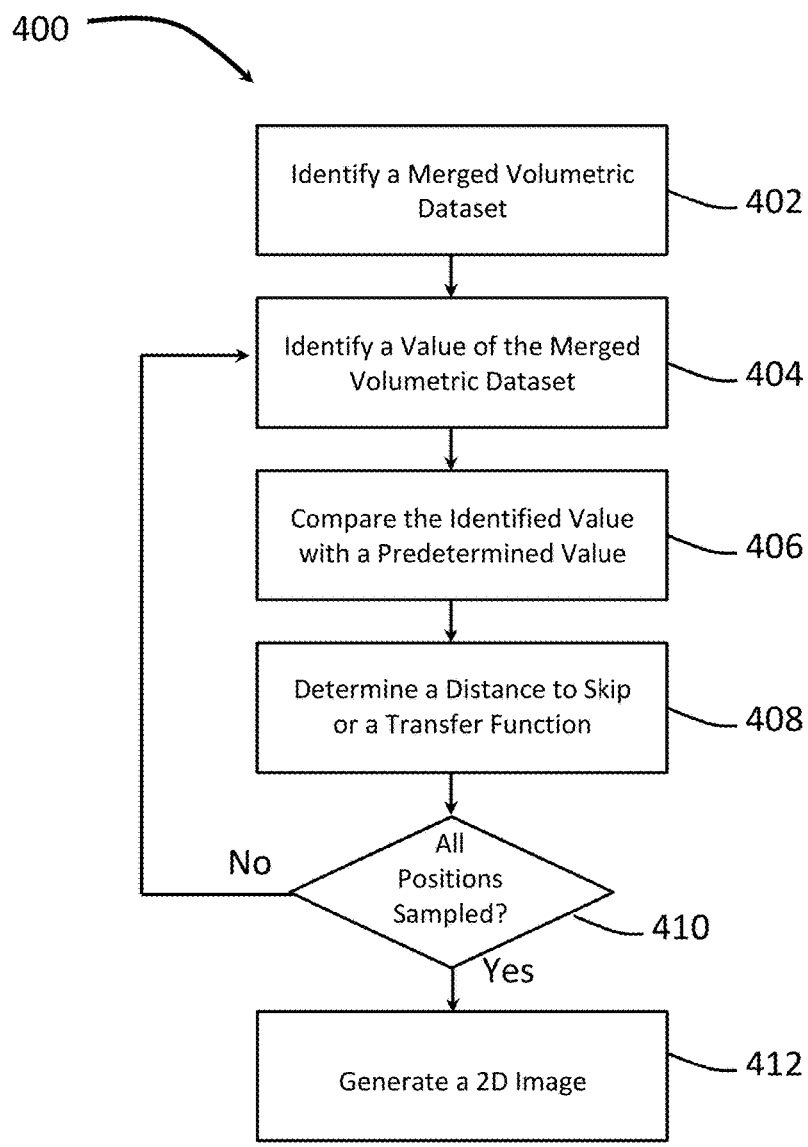
FIG. 4 shows a flowchart of one embodiment of a method for generating a two-dimensional (2D) image from a volumetric dataset.

FIG. 3 shows a flowchart of one embodiment of a method 300 for adaptively storing distance information for volume rendering a first volumetric dataset, and FIG. 4 shows a flowchart of one embodiment of a method 400 for generating a 2D image from the first volumetric dataset. The method 300 of FIG. 3 and the method 400 of FIG. 4 may be performed using the imaging system 100 shown in FIGS. 1 and 2 or another imaging system. Each of the methods 300, 400 is implemented in the respective order shown, but other orders may be used. Additional, different, or fewer acts may be provided. Similar methods may be used for adaptively storing information for volume rendering and/or generating an image from a volumetric dataset.

In one embodiment, an imaging device (e.g., the imaging device 102) generates the first volumetric dataset, and the first volumetric dataset is stored in a memory (e.g., the memory 216). The first volumetric dataset represents at least a portion of an object (e.g., a patient) and includes voxels having respective first values.

A volumetric dataset may be a set of voxels on a discrete 3D rectangular lattice, with zero-based voxel indices x, y and z and a resolution (e.g., number of voxels) of Vw, Vh and Vd (e.g., width, height, depth). $\Delta x$, $\Delta y$ and $\Delta z$ are used to describe the spatial extent of a voxel in each dimension. This allows for anisotropic voxels, as commonly present in medical applications. For example, the voxel values are within the integer range Rv=[Imin,Imax) (e.g., the range [0,4096)) for an unsigned 12 bit data set.

In act 302, a processor (e.g., the processor 214) generates a second volumetric dataset. The second volumetric dataset identifies a first subset of the voxels of the first volumetric dataset that represents empty space, and a second subset of the voxels of the first volumetric dataset that represents non-empty space.

In one embodiment, the second volumetric dataset is a binary volumetric dataset. Generating the second volumetric dataset includes generating the second volumetric dataset based on transfer functions or lookup tables corresponding to the voxels, respectively.

A transfer function or LUT maps the physical data range, Rv, of at least a portion of the volumetric dataset V to the optical properties of color and opacity. An input of an LUT is a voxel value $\omega$. For opacity, $\alpha$, $LUT^\alpha: R_v \to \mathbb{R}$; $LUT^\alpha (\omega)=\alpha|\alpha \in [0,1]$, with $\alpha=0$ being completely transparent and $\alpha=1$ being fully opaque.

A binary volumetric dataset (e.g., the second volumetric dataset; a segmentation mask; a binary volume B) encodes Boolean values defining whether voxels are part of the segmentation (e.g., B(x,y,z)=true) or outside the segmentation (e.g., B(x,y,z)=false). In other words, the binary volumetric dataset encodes empty and non-empty space. The "true" voxels may be foreground voxels, and the "false" voxels may be background voxels. Both disjoint subsets are defined as:

$$B^1 \subseteq B \Leftrightarrow \forall (x, y, z)\{B(x, y, z) = \text{true}\}$$
$$B^0 \subseteq B \Leftrightarrow \forall (x, y, z)\{B(x, y, z) = \text{false}\}, B^1 \cap B^0 = \emptyset.$$

The $LUT^\alpha$ of the first volumetric dataset and all segmentation masks are taken into account. Thus, the non-empty space volume, E, may be described, as follows:

$$E(x, y, z) = \begin{cases} \text{true}, \exists i: LUT_i^\alpha(\omega) > 0 \\ \text{false}, \forall i: LUT_i^\alpha(\omega) = 0 \end{cases}, \omega = V(x, y, z)$$

In other words, if any of the $LUT_i^\alpha$ classifies a visible structure in w, the voxel is non-empty. If all of the $LUT_i^\alpha$ are fully transparent in w, the voxel in empty space, respectively.

For each segmentation mask, a corresponding $LUT^\alpha$ exists. Thus, for the first volumetric dataset and (N−1) segmented objects, $LUT^\alpha$s indexed as $LUT_i^\alpha$, $i \in [0, N)$ are provided.

In act 304, the processor generates a distance field based on the second volumetric dataset. The distance field identifies, for each voxel of the first subset of voxels, a distance to a closest voxel of the second subset of voxels. In other words, the distance field identifies a respective distance from any background voxel to a closest foreground voxel. For the second volumetric dataset (e.g., the binary volumetric dataset), for example, the distance field provides a minimal distance from any voxel $(x,y,z) \in B^0$ to a voxel $(a,b,c) \in B^1$ having a "true" value under a distance measure $dist_m$ (e.g., Euclidean or City-block). For example, the Euclidean distance measure, $dist_e$, and the obtained distance, $\delta e$, are given by the L2 norm for two voxels p=(x,y,z) and q=(a,b,c):

$$\delta_e = dist_e(p,q) = \sqrt{(p_x-q_x)^2+(p_y-q_y)^2+(p_z-q_z)^2}.$$

As another example, the City-block distance, $dist_{cb}$, and the obtained distance, $\delta cb$, are equal to the L1 norm:

$$\delta_{cb} = dist_{cb}(p,q) = |p_x-q_x|+|p_y-q_y|+|p_z-q_z|.$$

In one embodiment, the distance field $D_B^0$ may be calculated using a discrete distance transform on B with $p \in B^0$:

$$D_B^0(p) = \min_{q \in B^1} dist_m(p, q)$$

The distance measure used may be independent of the methods 300, 400 of the present embodiments.

The distance field is generated in a same coordinate frame as a coordinate frame used by algorithms used for rendering (e.g., to generate distances in same units). In one embodiment, anisotropic voxel extents ($\Delta_x$, $\Delta_y$, $\Delta_z$) are provided in normalized texture space, as a number of rendering algorithms (e.g., direct volume rendering (DVR)) are realized on graphics hardware.

In one embodiment, the processor first generates another volumetric dataset by applying a dilation operation on the second volumetric dataset, such that interpolation artifacts are prevented during rendering. The distance field generated in act 304 is generated based on this volumetric dataset resulting from the dilation operation applied to the second volumetric dataset. A size of a structuring element used for dilation depends on an interpolation method used during rendering (e.g., trilinear or tricubic interpolation). The size of the dilation depends on (e.g., matches) the interpolation method.

Figure 5:
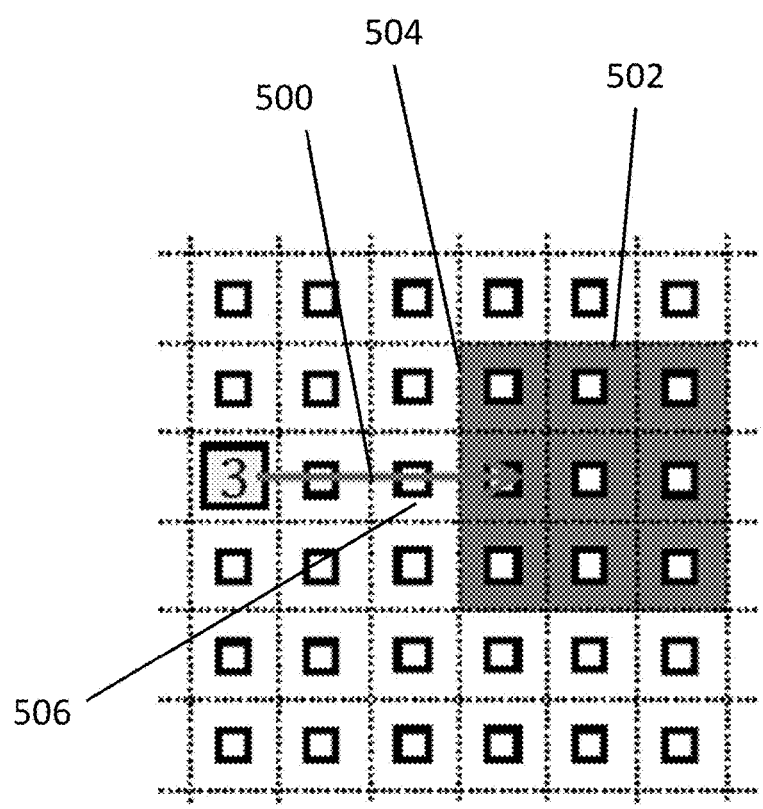
FIG. 5 illustrates the calculation of a distance field on a non-dilated volume.
Figure 6:
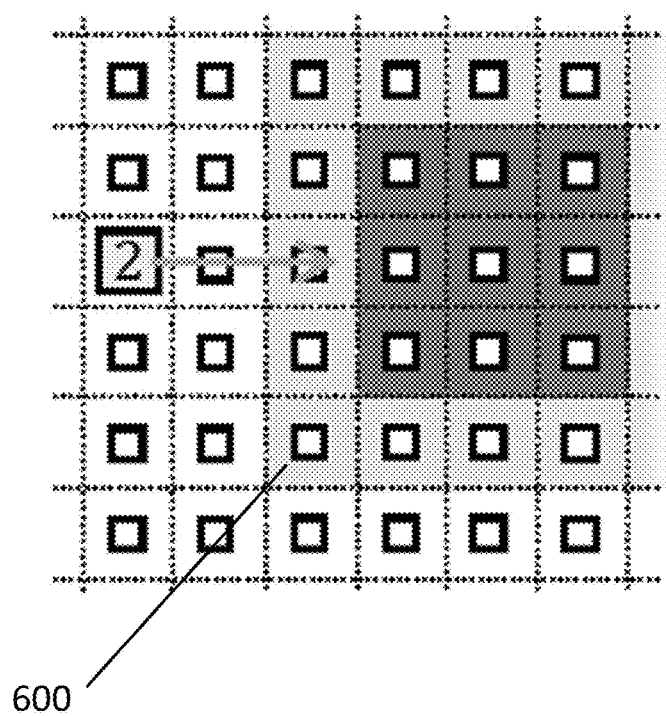
FIG. 6 illustrates the calculation of the distance field on a dilated volume.

The dilation provides correct sampling in a transition from empty space to visible structures. As shown in FIG. 5, the issue of calculating the distance field on a non-dilated volume E is illustrated. The foreground voxels $B^1$ of the non-dilated volume E are shaded, and the background $B^0$ is white. The small squares mark voxel centers on voxel lattices, respectively, and the dotted lines represent borders of the voxels, respectively. The Euclidean distance of the highlighted voxel is three. Skipping three units along a ray 500 yields a position already inside a region of interest 502 (e.g., a structure). A boundary 504 of the structure 502 may thus be sampled incorrectly, as a preceding sample position 506 within the structure 502 may be skipped. As shown in FIG. 6, the calculation of the distance on the dilated version $\vec{E}$ may overcome this issue. Skipping two units instead of three units, as shown in FIG. 5, correctly positions the sampling in front of the structure 502 (e.g., as a result of a dilated foreground $\vec{E}$ 600).

In act 306, the processor identifies a third volumetric dataset. The third volumetric dataset identifies, for each of the voxels, to which portion or portions of the first volumetric the respective voxel belongs. The third volumetric dataset is, for example, a label volume L. The label volume L provides the N integer indices for selecting a $LUT_i^\alpha$ of the segmentation mask a voxel belongs to. In one embodiment, the labels are encoded in 8 bit integers, so that $R_L=[0,2^8)=[0,256)$. Other bitnesses, however, may be provided.

The label volume L may not utilize all bits available per voxel. With labels encoded in 8 bit integers, for example, 256 labels are available for encoding different segmentation masks. Many DVR scenes specify a small number of different segmentations. For example, a DVR scene may specify five or less different segmentations. Accordingly, the label volume L may be used to store other data (e.g., a distance field) due to the large number of labels within the label volume L available for encoding. Other volumetric datasets, in which all bits available per voxel are not utilized, may be used for storing additional data such as, for example, a distance field.

In act 308, the processor selects at least one compression method. In one embodiment, the processor selects the at least one compression method based on the distance field, available storage or an available value range within the third volumetric dataset, structures represented within the first volumetric dataset, computational complexity of the at least one compression method, capabilities of a memory storing the third volumetric dataset, the processor, or the memory and the processor, or any combination thereof. For example, the processor selects the at least one compression method based on: the size of M (e.g., the size of the available integer range within a destination volume such as the third volumetric dataset); computational complexity of the overall rendering and capacity of a host system (e.g., the processor), which may demand a lightweight compression function or allow a more elaborate compression function; a maximum distance, max $D_E^0$ in the distance field; a distribution of distances in the distance field; a topology or a shape of the visible structures within the volumetric dataset to be rendered (e.g., the first volumetric dataset), as different characteristics of shapes may benefit from a per-voxel compression encoding; or any combination thereof. In one embodiment, the processor selects the at least one compression method on-the-fly. For example, with Monte-Carlo based renderers, in which hundreds of iterations are rendered, the performances of different compression methods or functions, respectively, may be compared, and the fastest compression method may be selected. Other criteria may be used to select the at least one compression method.

Given N $LUT^\alpha$s present in a DVR scene, each of which is represented by an index in the third volumetric dataset (e.g., the label volume L), the remaining M=|RL|−N integer values are used for encoding the empty space distance field $D_E^0$. Since the distances are real numbers, a compression scheme $C$ that provides the following mapping, for example, is selected:

$$C: \mathbb{R}^+ \to \mathbb{N}^{=M}, \tilde{\delta}_m = C_{(\delta_m,M)}.$$

The compression may be adapted whenever the number of labels, and with this the value of M, changes. The second parameter of the compression function $C$ differs. In one embodiment, the compression function may thus be changed on-the-fly.

The at least one compression method may be any number of compression methods including, for example, compression based on clamping, normalizing, low-precision float encoding, non-linear scaling, direction-dependent compression, a per-voxel strategy selection, or any combination thereof. For compression based on clamping, the distances δm are clamped to the number of remaining integer values M, such that δ̃m=[min (M,δm)]. For compression based on normalizing, the distances δm are scaled by a normalization factor such that the greatest distance equals to M:

$$\tilde{\delta}_m = \left\lfloor \delta_m \frac{M}{\max D_E^0} \right\rfloor.$$

For compression based on low-precision float encoding, the free bits in the label volume (e.g., $\lfloor \log_2(M) \rfloor$) are used, and the distances are converted into a float format with fewer bits. The float format may omit the sign bit because all distances are positive, and leave more bits for exponent and/or mantissa. The choice of the base, the use of exponent bias (e.g., as constant value), and encoding of subnormal numbers is supported to allow adaption to the given range of the distance field.

For compression based on non-linear scaling, a non-linear scaling method including, for example, logarithmic, exponential, or power functions may be used. Suitability of the non-linear scaling method may depend on properties of the distance field or the dataset (e.g., the third volumetric dataset). Well known non-linear scaling methods used in other fields such as, for example, non-linear tone mapping functions may also be employed.

For direction-dependent compression, if the distance field preserves the directional information to the closest foreground voxel (e.g., if $\delta m \in \mathbb{R}^3$ store the vector to the closest foreground voxel), the distance may be compressed differently depending on the direction. For example, important directions may be encoded with a higher resolution than unimportant directions.

In one embodiment, selecting the at least one compression method includes the processor selecting a first compression method of the at least one compression method for a first distance of the distance field based on available storage within a first voxel of the third volumetric dataset corresponding to the first distance. The processor further selects a second compression method of the at least one compression method for a second distance of the distance field based on available storage within a second voxel of the third volumetric dataset corresponding to the second distance.

For example, for compression based on a per-voxel selection strategy, $C_{voxel}$, the first K integers are used to encode the compression function used for the current voxel. This gives the flexibility to use varying compression functions depending on, for example, properties of the visible structures within the volume dataset. The remaining (M−K) integer values may then be used as range for the actual compression. $C_{voxel}$ is, for example, a nested compression function that redirects to $C_i$ with $i \in [0,K)$.

In act 310, the processor compresses the distance field based on the at least one compression method. In one embodiment, all of the distances of the distance field generated in act 304 are compressed with a same compression method. In another embodiment, more than one compression method (e.g., selected in act 308) are used to compress different distances of the distance field, respectively. For example, a first subset of the distances of the distance field are compressed with a first compression method, and a second subset of the distances of the distance field are compressed with a second compression method. More than two compression methods may be used to compress the distance field in act 310.

In act 312, the processor generates a merged volumetric dataset. For example, the processor merges the compressed distance field with the third volumetric dataset. Since (N+M) ≤RL, the merging of the compressed distance field with the third volumetric dataset (e.g., the label volume L) may be a simple addition of the two values, with the compressed distances offset by the number of labels:

$$L^{\tilde{\delta}}(x,y,z)=i+(\mathcal{C}_{(\delta_m,M)+N})=L(x,y,z)+(\mathcal{C}_{(}D_E^0(x,y,z), M)+N).$$

L$\tilde{\delta}$ refers to the same allocated memory as L. Within the merged volumetric dataset, label indices and compressed distances are easily distinguishable, as the label indices and the compressed distances are separated by the threshold value N.

As discussed above, unused memory in an existing data structure (e.g., the third volumetric dataset) is used to encode the compressed distance field (e.g., for empty space skipping) without increasing the memory footprint of a rendering algorithm to be used. The encoding is adaptively adjusted to best fit into the available memory (e.g., integer range). Unlike prior art methods in which data structures of fixed size and additional memory are used, the method 300 of one or more of the present embodiments may not use additional memory for storing the distance field, for example.

A 2D image may be generated (e.g., rendered) based on the first volumetric dataset and the merged volumetric dataset generated in act 312 of the method 300 described above with reference to FIG. 3. With reference to FIG. 4, in act 402 of the method 400, the processor or another processor identifies the volumetric dataset generated in act 312 (e.g., the merged volumetric dataset). For example, the merged volumetric dataset may be stored in the memory or another memory as a dataset of a plurality of datasets stored in the memory.

The merged volumetric dataset includes second values corresponding to the voxels of the first volumetric dataset, respectively. Each second value of a first subset of the second values represents a respective distance to a closest voxel. Each second value of a second subset of the second values identifies a transfer function to be used for the respective voxel. In one embodiment, each second value of the second subset of the second values identifies a lookup table (LUT) to be used for the respective voxel.

In act 404, the processor identifies one of the second values of the merged volumetric dataset that corresponds to a location along a traversed viewing ray that has not yet been processed during volume rendering. In act 406, the processor compares the respective second value, which corresponds to a voxel of the first volumetric dataset, to a predetermined value. In one embodiment, the predetermined value is based on a number of transfer functions represented within the second subset of the second values. Other predetermined values may be used.

In act 408, the processor determines the distance to the closest voxel for the respective voxel or identifies the transfer function to be used for the respective voxel based on a result of the comparison of the respective second value to the predetermined value.

Whether the processor determines the distance to the closest voxel or identifies the transfer function to be used is based on the respective voxel being processed (e.g., at the location along the viewing ray being processed). For example, the processor determines whether to determine the distance to the closest voxel or identifies the transfer function to be used based on whether the comparison of act 406 determines the respective second value is greater than, equal to, or less than the predetermined value.

In one embodiment, the processor identifies the transfer function to be used for the respective voxel when the respective second value is less than the predetermined value, and determines the distance to the closest value for the respective voxel when the respective second value is greater than or equal to the predetermined value. In other embodiments, the comparison results may be used differently. For example, the processor may identify the transfer function to be used for the respective voxel when the respective second value is less than or equal to the predetermined value.

For example, the merged volumetric dataset (e.g., the label-distance volume L$\tilde{\delta}$) is sampled with nearest neighbor interpolation. Given the sampled value s, the processor may decide between two paths in a ray integration step:

(s<M)→Classification (of non-empty voxel)
(s≥M)→Space Skipping (of empty space)

For the classification case (e.g., s<M), the sampled value s serves as an index to select the lookup table (e.g., $LUT_i^\alpha$). For the space skipping case (e.g., s≥M), the processor determines a distance to skip based on the sampled value s.

Each representation of the respective distance to the closest voxel stored in the merged volumetric dataset (e.g., of the first subset of the second values) is a compressed representation of the respective distance to the closest voxel. The representation of the respective distance is compressed based on a respective compression method. For example, different representations of distances stored within the merged volumetric dataset may be compressed with different compression methods, respectively. The processor determines the distance to skip from the sampled value s by decompressing the encoded distance using, for example, a reverse operation of the employed compression function $\mathcal{C}$:

$$\delta m = \mathcal{C}^{-1}(\tilde{\delta}m) = \mathcal{C}^{-1}(s-M).$$

In one embodiment, a portion of the sampled value s identifies the employed compression function. In another embodiment, data identifying the employed compression function is stored separately (e.g., within the memory).

The processor uses the determined distance for skipping along the viewing ray. In parametric form this is given by p'=p+δ$_m$$\vec{d}$ with p being the current position and d being the normalized ray direction. The new position p' may still be in empty space (e.g., due to quantization or clamping of actual distance values by the compression function $\mathcal{C}$). In this case, the rendering loop simply returns to act 404.

In act 410, the processor determines whether all of the sample positions (e.g., corresponding to second values) along the viewing ray have been processed. If all of the sample positions along the viewing ray have not been processed, the method 400 returns to act 404. If all of the sample positions along the viewing ray have been processed, the method 400 returns to act 404 if another viewing ray is to be processed and moves to act 412 if no more viewing rays are to be processed.

In act 412, the processor generates the 2D image based on the first volumetric dataset, the determined distances, and the identified transfer function. Generating the 2D image based on the determined distances includes skipping, for a voxel corresponding to a second value of the first subset of the second values, a distance along a viewing ray based on the respective decompressed representation of the distance to the closest voxel. Any number of rendering algorithms may be used. For example, a volume rendering technique (VRT) such as, for example, ray casting may be used. Any number of ray casting algorithms including, for example, Monte Carlo path tracing or distributed ray tracing based volume rendering may be used. Other rendering algorithms may be used. In one embodiment, the method 400 further includes displaying, by a display (e.g., the display 218) the 2D image generated in act 412.

Figure 7:
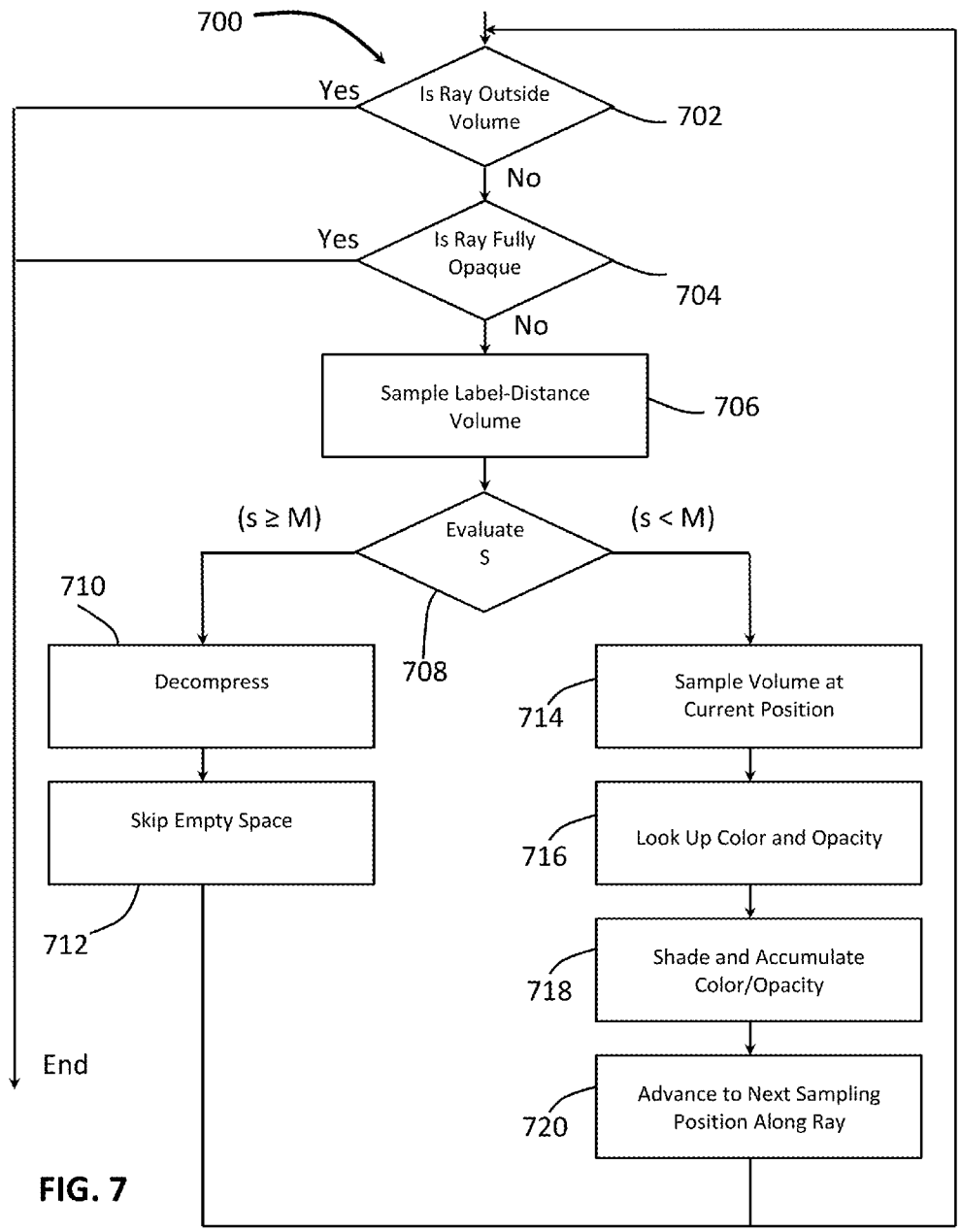
FIG. 7 shows a flowchart of another embodiment of a method for generating a 2D image from a volumetric dataset.

FIG. 7 shows a flowchart of another embodiment of a method 700 for generating a 2D image from the first volumetric dataset. In act 702, a processor determines whether a ray is outside of a volume (e.g., defined by the first volumetric dataset). If the processor determines the ray is outside of the volume, the method 700 ends. Alternatively, the method 700 may return to act 702 if another ray is to be processed. If the processor determines the ray is not outside of the volume, the method 700 continues to act 704.

In act 704, the processor determines whether the ray is fully opaque. If the processor determines the ray is fully opaque, the method 700 ends. Alternatively, the method 700 may return to act 702 if another ray is to be processed. If the processor determines the ray is not fully opaque, the method 700 moves to act 706.

In act 706, the processor samples a label-distance volume at a current position to identify a sampled value. The label-distance volume may be a merged volumetric dataset including data representing a distance field and data identifying look-up tables for rendering.

In act 708, the processor evaluates the sampled value. For example, the processor determines whether the sampled value is greater than, equal to, or less than a size of an available integer range within a destination volume (e.g., a label volume). If the processor determines the sampled value is, for example, greater than or equal to the available integer range, the method 700 moves to act 710.

In act 710, the processor decompresses a representation of a distance value at the current position. The representation of the distance value is, for example, a compressed distance value at the current position. The processor determines the compressed distance value by subtracting the available integer range from the sampled value, and decompresses the compressed distance value using a reverse operation of a compression function originally used to compress the distance value.

In act 712, the processor skips empty space by advancing a number of units along the ray. The number of units along the ray to be skipped is determined by the decompressed distance value. The method is executed for a number of sampled values and/or rays, and thus, the method 700 may return to act 702.

If the processor determines the sampled value is, for example, less than the available integer range, the method 700 moves to act 714. In act 714, the processor identifies a look-up table to be used based on the sampled value. In act 716, the processor determines a color and an opacity for a voxel corresponding to the sampled value from the identified loop-up table. In act 718, the processor performs shading and accumulates color and opacity. In act 720, the processor advances to a next sample position along the ray, and the method 700 returns to act 702.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for adaptively storing distance information for volume rendering a first volumetric dataset, the first volumetric dataset including voxels having respective values, the method comprising:
generating, by a processor, a second volumetric dataset, the second volumetric dataset identifying a first subset of the voxels of the first volumetric dataset representing empty space and a second subset of the voxels of the first volumetric dataset representing non-empty space;
generating, by the processor, a distance field based on the second volumetric dataset, the distance field identifying, for each voxel of the first subset of voxels, a distance to a closest voxel of the second subset of voxels;
identifying, by the processor, a third volumetric dataset, the third volumetric dataset identifying, for each of the voxels, to which portion or portions of the first volumetric dataset the respective voxel belongs;
selecting, by the processor, at least one compression method;
compressing, by the processor, the distance field based on the at least one compression method; and
merging, by the processor, the compressed distance field with the third volumetric dataset.

2. The method of claim 1, wherein selecting the at least one compression method comprises selecting the at least one compression method based on the distance field, available storage or an available value range within the third volumetric dataset, structures represented within the first volumetric dataset, computational complexity of the at least one compression method, capabilities of a memory storing the third volumetric dataset, the processor, or the memory and the processor, or any combination thereof.

3. The method of claim 1, wherein the second volumetric dataset is a binary volumetric dataset, and
wherein generating the second volumetric dataset comprises generating the second volumetric dataset based on transfer functions corresponding to the voxels, respectively.

4. The method of claim 1, wherein selecting the at least one compression method comprises selecting the at least one compression method based on at least a maximum distance in the distance field, a distribution of distances within the distance field, or a combination thereof.

5. The method of claim 1, wherein the at least one compression method comprises compression based on clamping, normalizing, low-precision float encoding, non-linear scaling, direction-dependent compression, a per-voxel compression strategy selection, or any combination thereof.

6. The method of claim 1, further comprising generating a fourth volumetric dataset, the generating of the fourth volumetric dataset comprising applying, by the processor, a dilation operation on the second volumetric dataset, such that interpolation artifacts are prevented during rendering, wherein generating the distance field comprises generating the distance field based on the fourth volumetric dataset.

7. The method of claim 1, wherein selecting the at least one compression method comprises:
   selecting, by the processor, a first compression method of the at least one compression method for a first distance of the distance field based on the distance field, structures represented within the first volumetric dataset, computational complexity of the first compression method, capacity of a memory storing the third volumetric dataset, available storage or an available value range within a first voxel of the third volumetric dataset corresponding to the first distance, or any combination thereof; and
   selecting, by the processor, a second compression method of the at least one compression method for a second distance of the distance field based on the distance field, structures represented within the first volumetric dataset, computational complexity of the second compression method, capabilities of a memory storing the third volumetric dataset, the processor, or the memory and the processor, available storage or an available value range within a second voxel of the third volumetric dataset corresponding to the second distance, or any combination thereof.

8. The method of claim 7, wherein the first compression method is different than the second compression method.

9. In a non-transitory computer-readable storage medium storing instructions executable by one or more processors to adaptively store distance information for volume rendering a first volumetric dataset, the first volumetric dataset including voxels having respective values, the instructions comprising:
   generating a second volumetric dataset, the second volumetric dataset identifying a first subset of the voxels of the first volumetric dataset representing empty space and a second subset of the voxels of the first volumetric dataset representing non-empty space;
   generating a distance field based on the second volumetric dataset, the distance field identifying, for each voxel of the first subset of voxels, a distance to a closest voxel of the second subset of voxels;
   identifying a third volumetric dataset, the third volumetric dataset identifying, for each of the voxels, to which portion or portions of the first volumetric dataset the respective voxel belongs;
   selecting at least one compression method;
   compressing the distance field based on the at least one compression method; and
   merging the compressed distance field with the third volumetric dataset.

* * * * *